(12) United States Patent
Aizaki

(10) Patent No.: US 8,358,338 B2
(45) Date of Patent: Jan. 22, 2013

(54) IMAGE DATA PROCESSING APPARATUS, ITS STORAGE MEDIUM AND ITS METHOD

(75) Inventor: Shinichiro Aizaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 697 days.

(21) Appl. No.: 12/482,045

(22) Filed: Jun. 10, 2009

(65) Prior Publication Data

US 2010/0157042 A1  Jun. 24, 2010

(30) Foreign Application Priority Data

Jun. 16, 2008 (JP) ................................. 2008-156475

(51) Int. Cl.
*H04N 7/18* (2006.01)
(52) U.S. Cl. ............ 348/79; 348/80; 348/575; 348/659; 348/661; 348/663; 382/167; 382/162; 382/133; 382/128; 382/305
(58) Field of Classification Search ............. 348/79, 348/80, 659, 661, 663, 575; 382/167, 162, 382/133, 128, 305
See application file for complete search history.

(56) References Cited

U.S. PATENT DOCUMENTS

| 5,487,020 | A | * | 1/1996 | Long | 382/167 |
| 6,111,259 | A | | 8/2000 | Arai | |
| 6,160,579 | A | * | 12/2000 | Shiraiwa et al. | 348/224.1 |
| 2001/0035988 | A1 | * | 11/2001 | Semba et al. | 358/518 |
| 2005/0073707 | A1 | * | 4/2005 | Yamazoe | 358/1.9 |
| 2005/0099431 | A1 | | 5/2005 | Herbert et al. | |
| 2005/0122533 | A1 | | 6/2005 | Nakagawa | |

FOREIGN PATENT DOCUMENTS

| EP | 0 604 755 A1 | 7/1994 |
| JP | H8-287215 | 11/1996 |
| JP | H11-98372 | 4/1999 |

OTHER PUBLICATIONS

Extended European Search Report dated Dec. 23, 2010.
European Official Action dated Oct. 18, 2012 from related application EP 09 007 621.7-1228.

* cited by examiner

*Primary Examiner* — Shawn An
(74) *Attorney, Agent, or Firm* — Scully, Scott, Murphy & Presser, P.C.

(57) ABSTRACT

An image data processing includes: obtaining first image data; outputting the first image data to the image display devices; obtaining an attention area composed of one or more arbitrarily specified pixels from the first image outputted to the image display devices ; displaying a color chart whose hue and chroma are gradually changed toward around the color corresponding to the image data of the attention area; obtaining arbitrarily selected color information from the displayed color chart; obtaining a plurality of combinations of the attention area and the color information corresponding to the attention area and calculating a color parameter on the basis of the obtained plurality of combinations; converting the color of the obtained image data on the basis of the color parameter; and outputting the image data whose color is converted, to the image display devices as a second image.

3 Claims, 20 Drawing Sheets

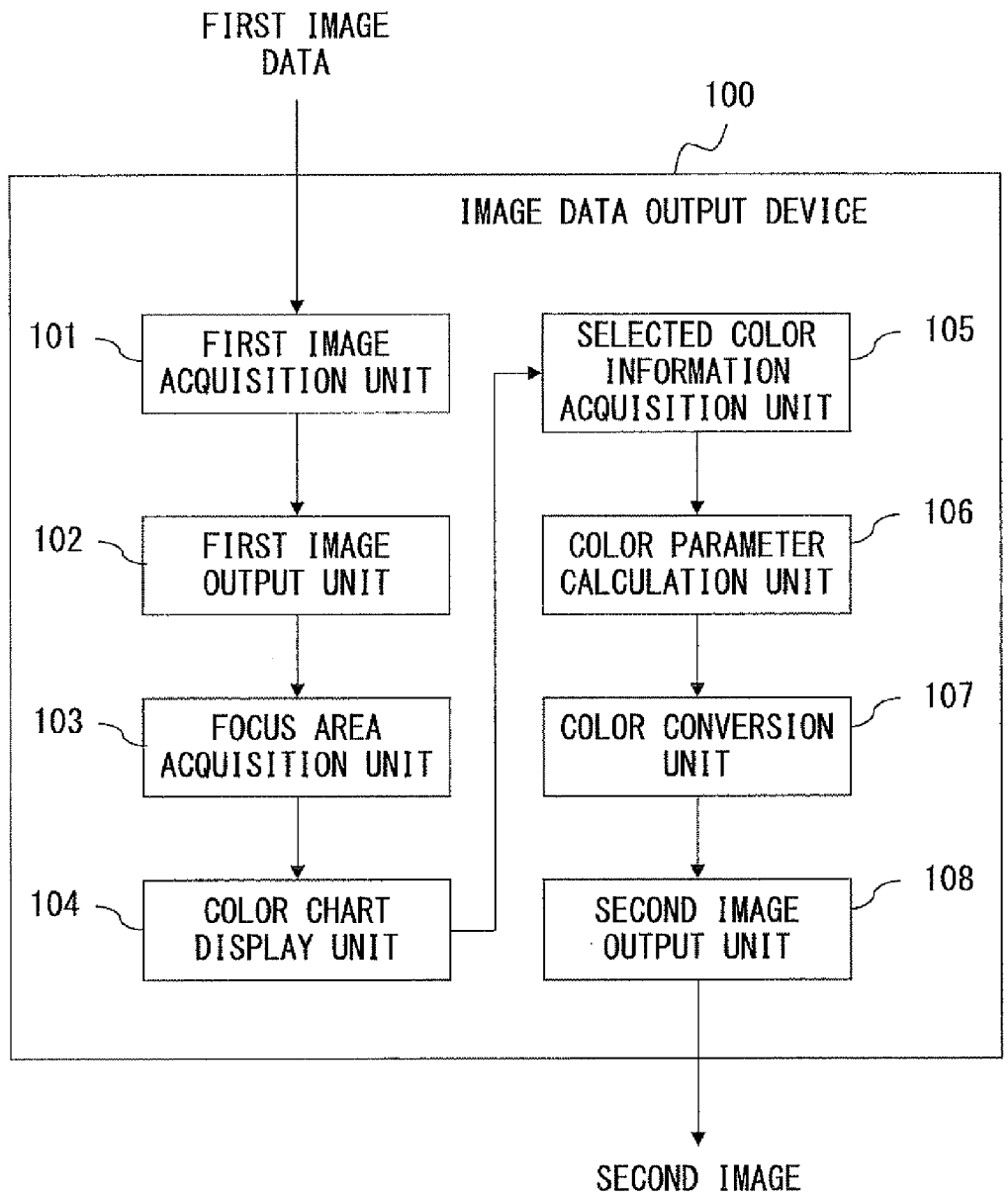
F I G. 3

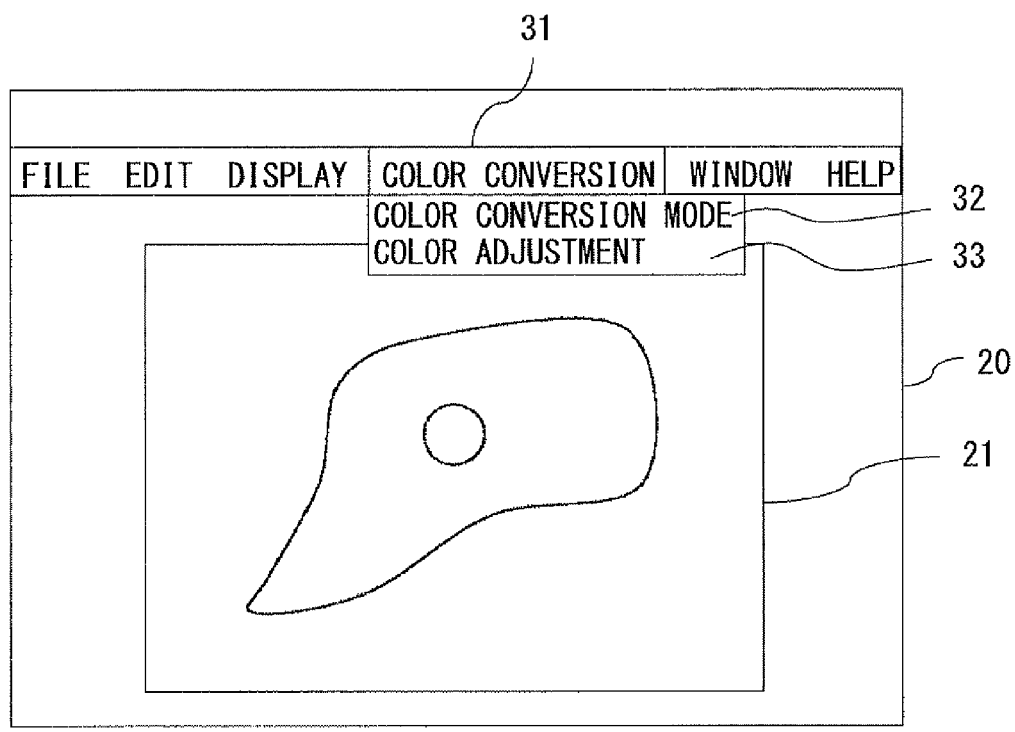
F I G. 5

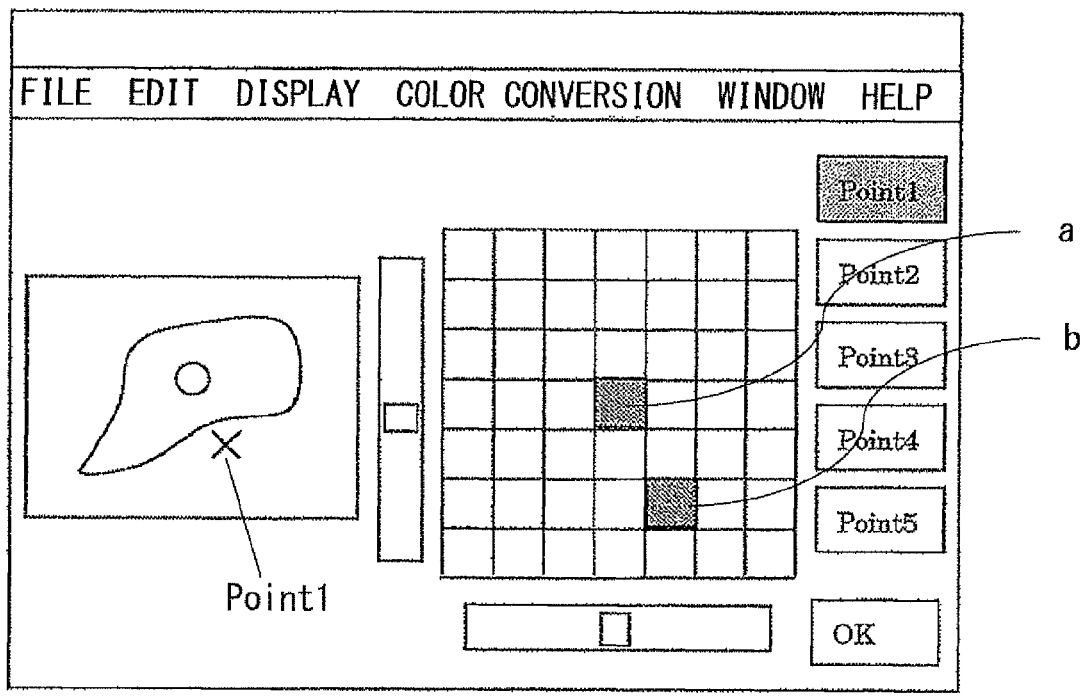
F I G. 7

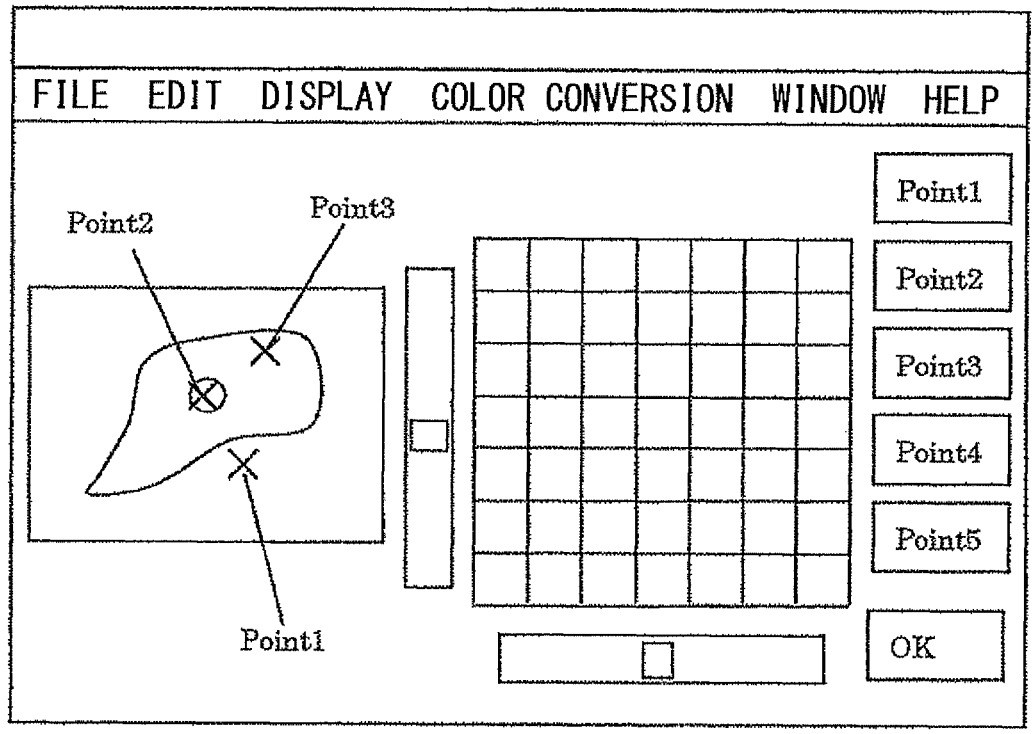
F I G. 8

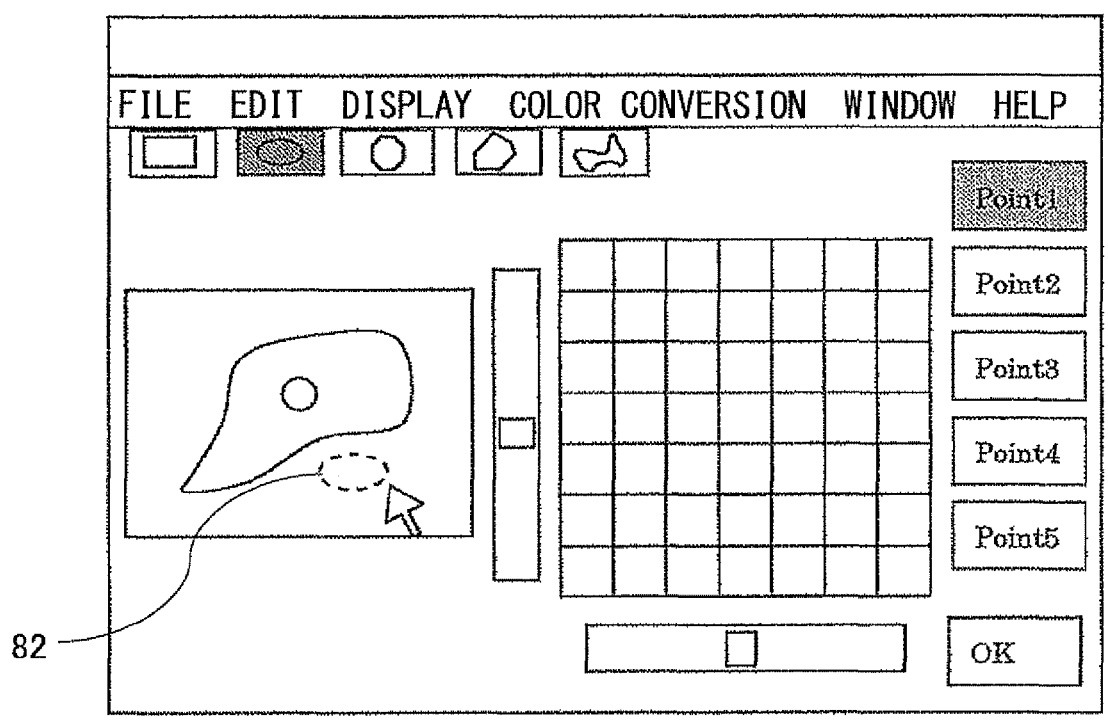
F I G. 1 1

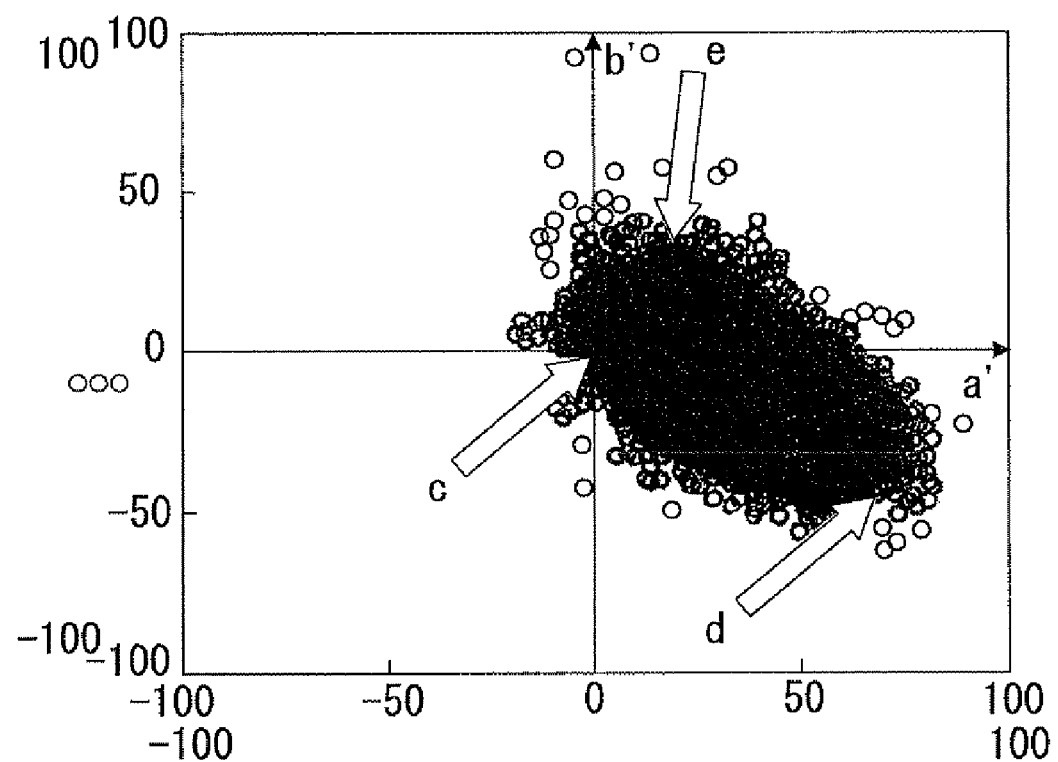
F I G. 15

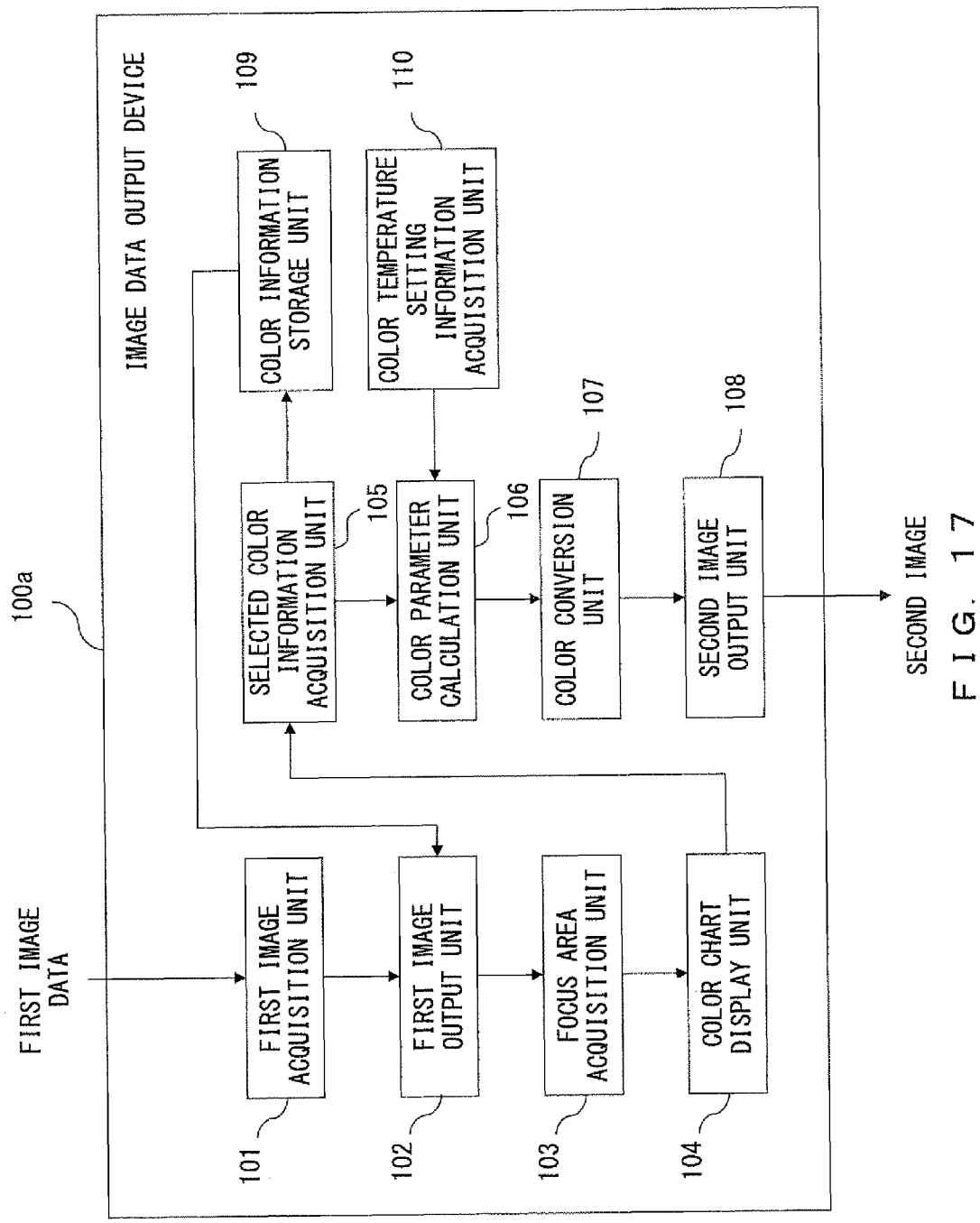
F I G. 17

IMAGE DATA PROCESSING APPARATUS, ITS STORAGE MEDIUM AND ITS METHOD

CROSS REFERENCE TO RELATED APPLICATION

This application is based on and claims the benefit of priority from the prior Japanese Patent Application No. 2008-156475 filed in Japan on Jun. 16, 2008, the entire contents of which are incorporated by this reference.

BACKGROUND OF THE INVENTION

The present invention relates to an imaging system/microscope imaging system for imaging and displaying/recording a subject image or the image of a specimen observed by a microscope by an imaging device, such as a CCD or the like, and more particularly to a technology for converting and outputting picked-up image data.

DESCRIPTION OF THE RELATED ART

Color adjustment is applied to an image picked up by a digital camera, according to the specifications of color space, such as sRGB or the like. Therefore, when the characteristic of a display device for displaying an image departs from the characteristic intended by a manufacturer, of the digital camera, color reproducility deteriorates.

Furthermore, when presenting a picked-up image at an academic meeting and the like, sometimes presentation has to be made using an image display device, such as a projector or the like, which is not usually used. In this case, the display characteristic of the image display device differs from that of a usually used monitor, it is difficult for a presenter to reproduce color as intended in a preparation stage.

On the other hand, a method for correcting the color of an image in accordance with the taste of an operator is disclosed by Japanese Laid-open Patent Publication Nos. H11-98372 and H8-287215.

Japanese Laid-open Patent Publication No. H11-98372 discloses that a color chart is displayed for each fluorescent wavelength of an observation image in a laser scanning microscope, an operator selects a color, the image of each fluorescent wavelength is displayed in the selected color and color reproducility can be improved.

Japanese Laid-open Patent Publication No. H8-287215 discloses that typical colors, such as the flesh color of the skin of a person included in an image, the green of a lawn and the like are prepared to be set/selected in advance, a color patch is display when the color is selected and the flesh color can be corrected by selecting a preferable color on the patch.

SUMMARY OF THE INVENTION

An image data processing device according to the preferred embodiment of the present invention, capable of outputting image data to one or more image display devices comprising:
a first image output unit for outputting the first image data to the image display devices;
an attention area acquisition unit for obtaining an attention area composed of one or more arbitrarily specified pixels from a first image outputted to the image display devices;
a color chart display unit for displaying a color chart whose hue and chroma are gradually changed toward around the color corresponding to the image data of the attention area;
a selected color information acquisition unit for obtaining arbitrarily selected color information from the displayed color chart;
a color parameter calculation unit for obtaining a plurality of combinations of the attention area and the color information corresponding to the attention area and calculating a color parameter on the basis of the obtained plurality of combinations;
a color conversion unit for converting the color of the obtained image data on the basis of the color parameter; and
a second image output unit for outputting the image data whose color is converted to the image display devices as a second image.

A computer-readable portable storage medium according to the preferred embodiment of the present invention, on which is stored an image data processing program for enabling a computer to execute a process for outputting image data to one or more image display devices, the program comprising:
obtaining first image data;
outputting the first image data to the image display devices;
obtaining an attention area composed of one or more arbitrarily specified pixels from a first image outputted to the image display devices;
displaying a color chart whose hue and chroma is gradually changed from a color corresponding to the image data of the attention area toward around the color;
obtaining arbitrarily selected color information from the displayed color chart;
obtaining a plurality of color combinations of the attention area and the color information and calculating a color parameter on the basis of the obtained plurality of combinations;
converting the color of the obtained image data on the basis of the color parameter; and
outputting the image data whose color is converted to the image display devices as a second image.

An image data processing method according to the preferred embodiment of the present invention, for outputting image data to one or more image display devices comprising:
obtaining first image data;
outputting the first image data to the image display devices;
obtaining an attention area composed of one or more arbitrarily specified pixels from a first image outputted to the image display devices;
displaying a color chart whose hue and chroma are gradually changed toward around a color corresponding to the image data of the attention area;
obtaining arbitrarily selected color information from the displayed color chart;
obtaining a plurality of color combinations of the attention area and the color information and calculating a color parameter on the basis of the obtained plurality of combinations;
converting the color of the obtained image data on the basis of the color parameter; and
outputting the image data whose color is converted to the image display devices as a second image.

BRIEF DESCRIPTION OF THE DRAWINGS

FIG. 3 illustrates the summary of an image data processing device in the first preferred embodiment.

FIG. 5 illustrates the state where the color conversion menu of the GUI 20 of display software in the first preferred embodiment.

FIG. 7 illustrates the state where a color patch on a color chart 12, which coincides with the color of an attention area is selected, by comparing with the visual observation image of a microscope in the first preferred embodiment.

FIG. 8 illustrates the state where three or more attention areas are selected in the first preferred embodiment.

FIG. 11 illustrates a specification example of an attention area in the first preferred embodiment (variations 1 and 2) (No. 2).

FIG. 15 illustrates one example of plotting the data of all pixels on a CIE L*a*b* chromatic diagram in the first preferred embodiment (variations 1 and 5).

FIG. 17 illustrates the summary of an image data processing device 100a in the second preferred embodiment.

DESCRIPTION OF THE PREFERRED EMBODIMENTS

<The First Preferred Embodiment>

When preventing the above-described deterioration of color reproducibility using the method disclosed by Japanese Laid-open Patent Publication No. H11-98372, it is difficult to improve the color reproducibility of the entire image, since a general image is composed of intermediate colors having various wavelengths instead of a specific wavelength.

When preventing the above-described deterioration of color reproducibility using the method disclosed by Japanese Laid-open Patent Publication No. H8-287215, similarly it is difficult to improve the color reproducibility of the entire image, since all intermediate colors between specified colors cannot be corrected.

As described above, although a specific color can be corrected, the color of the entire general image including various colors cannot be corrected.

Therefore, it is an object of this preferred embodiment to provide an image data processing device capable of adjusting an output characteristic in such a way as to easily display a desired color even when it has a different characteristic from one that an image to be displayed intends.

Figure 1:
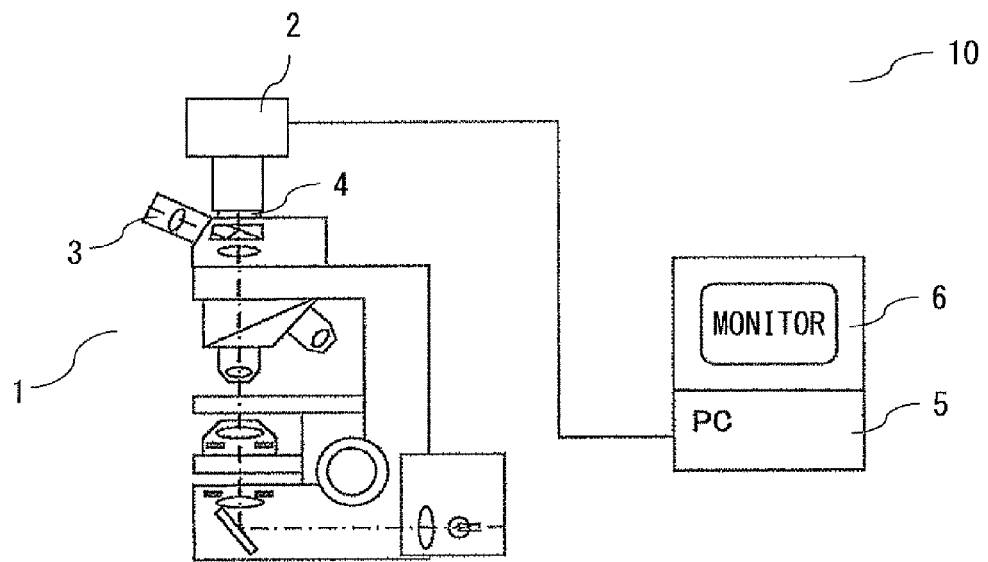
FIG. 1 illustrates a microscope digital camera system 10 in the first preferred embodiment.

FIG. 1 illustrates a microscope digital camera system 10 in this preferred embodiment. The microscope digital camera system 10 includes a microscope 1, a microscope digital camera 2, an eyepiece 3, a port 4, a personal computer (hereinafter called "PC") 5 and a monitor 6.

A specimen mounted on the stage of the microscope 1 can be observed by human eyes via the eyepiece 3. Furthermore, a specimen image obtained by the microscope 1 can be picked up by the microscope digital camera 2 via the port 4.

The microscope digital camera 2 is connected to the PC 5. Camera control, such as live image display, static image pick-up, picked-up image storage can be applied to the microscope digital camera 2 by using control software operated on the PC 5. The picked-up image can be stored in the PC 5 and also be displayed on the monitor 6.

Figure 2:
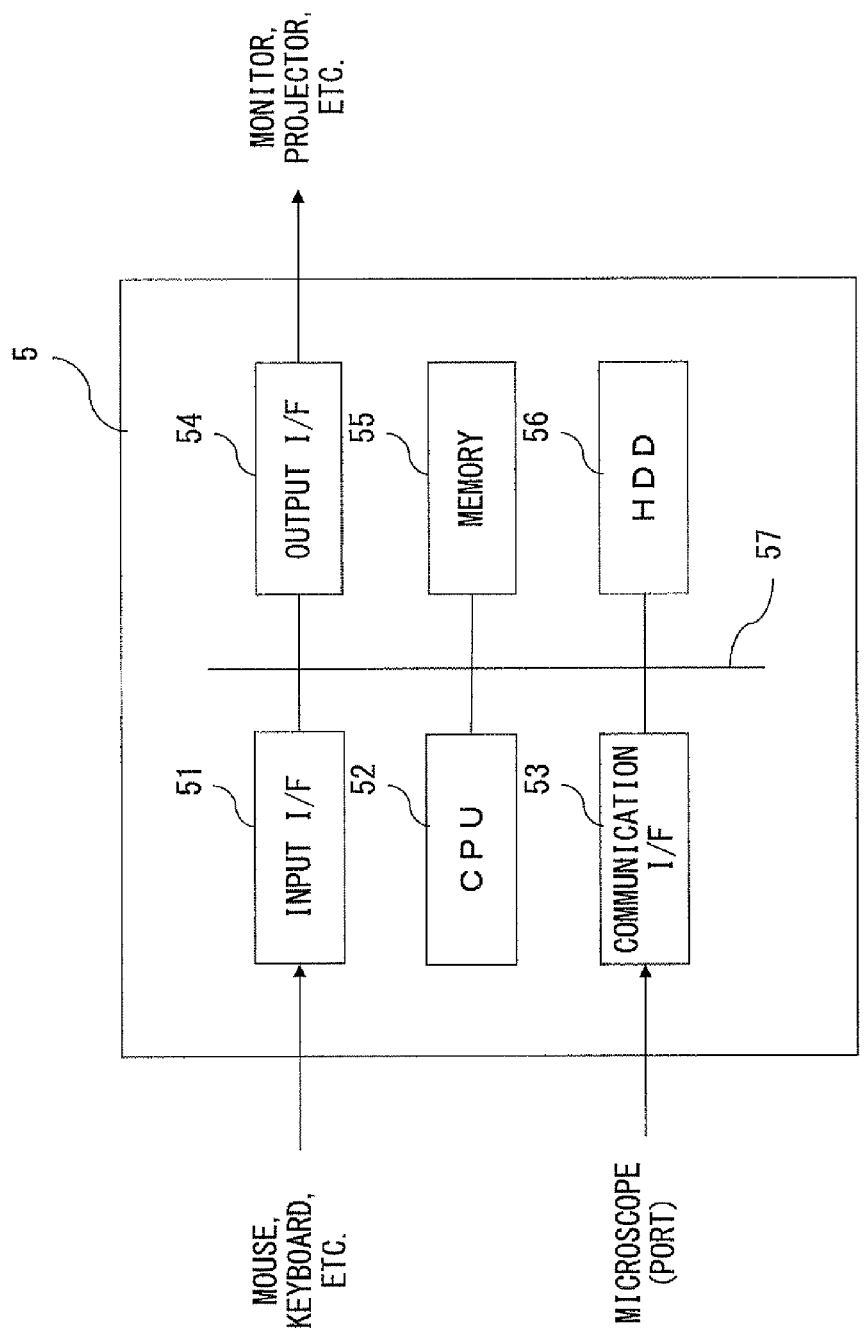
FIG. 2 illustrates the hardware configuration of a PC 5 in the first preferred embodiment.

FIG. 2 illustrates the hardware configuration of the PC 5 in this preferred embodiment. The PC 5 includes an input interface (I/F) 51, a central processing unit (CPU) 52, a communication I/F 53, an output I/F 54, memory 55, a hard disk drive (HDD) 56 and a bus 57.

The input I/F 51 is used to input instructions from an input device, such as a mouse, a keyboard and the like. The communication I/F 53 is used to communicate with the microscope 1. The HDD 56 stores a program for the present invention. For the memory 55, RAM, ROM or the like is used. The CPU 52 reads the program from the HDD 56 and executes it. The output I/F 54 is used to output images to the monitor 6, a projector or the like.

FIG. 3 illustrates the summary of an image data processing device 100 in this preferred embodiment. The image data processing device 100 can output image data to one or more image display devices. The PC 5 functions as the image data processing device 100 by executing a program for this preferred embodiment.

The image data processing device 100 includes a first image acquisition unit 101, a first image output unit 102, an attention area acquisition unit 103, a color chart display unit 104, a selected color information acquisition unit 105, a color parameter calculation unit 106, a color conversion unit 107 and a second image output unit 108.

The first image acquisition unit 101 obtains first image data (a specimen image obtained by the microscope 1). The first image output unit 102 outputs the first image data to the image display devices (a monitor, a projector and the like).

The attention area acquisition unit 103 obtains an attention area composed of one or more arbitrarily specified pixels from a first image outputted to the image display devices. The color chart display unit 104 displays a color chart in which hue and chroma is gradually changed from a color corresponding to the image data of the attention area toward around the color.

The selected color information acquisition unit 105 obtains arbitrarily selected color information from the displayed color chart. The color parameter calculation unit 106 obtains a plurality of combinations of the attention area and the color information and calculates a color parameter on the basis of the obtained combinations.

The color conversion unit 107 converts the color of the obtained image data on the basis of the color parameter. The second image output unit 108 outputs the image data whose color is converted to the image display devices as a second image.

Thus, a color chart in which hue and chroma are gradually changed from those of the original image data displayed on the image display devices, around the RGB data of the specified attention area and the color on the color chart can be selected as the preferable color of the attention area. Then, a plurality of combinations of the attention area and a preferable color selected from the color chart can be generated and a color parameter can be calculated on the basis of the combinations. Then, the original image data can be converted using this color parameter and the converted image data can be outputted to the image display devices.

Therefore, as to an image display device whose characteristic differs from one that an image to be displayed intends, its output characteristic can be easily adjusted in such a way as to display a desired color.

Figure 4:
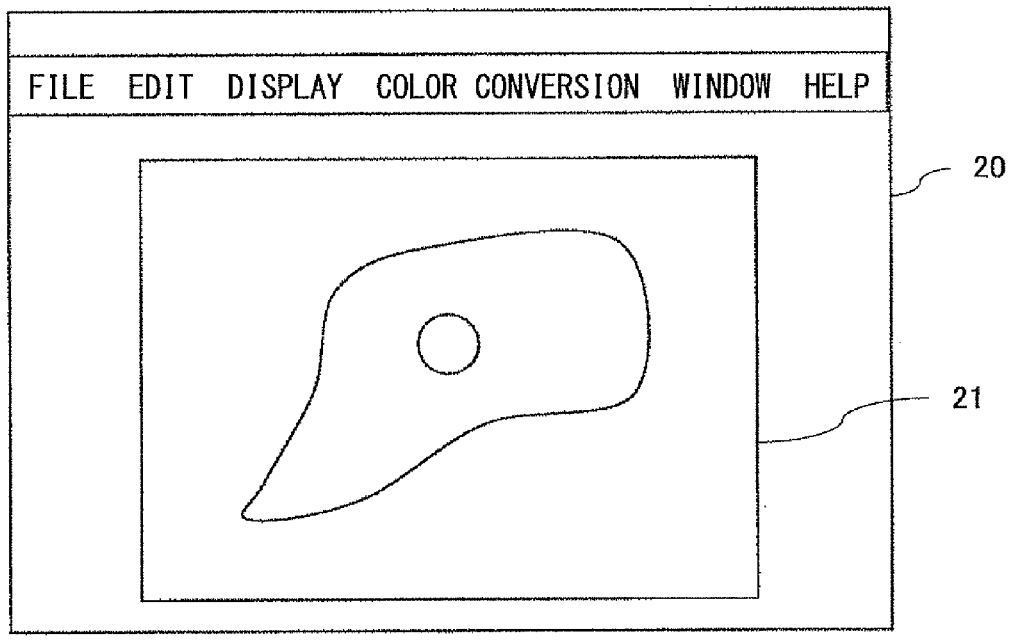
FIG. 4 illustrates one example of the GUI 20 of display software in the first preferred embodiment.

FIG. 4 illustrates one example of the GUI (graphical user interface) 20 of display software in the first preferred embodiment. FIG. 4 illustrates one example of a picked-up image displayed on the monitor 6. This display software can be part of the above-described control software. Alternatively it can be dedicated display software.

The operation menu of "File", "Edit", "Display", "Color conversion", "Window" and "Help" is displayed at the top of the screen of the GUI 20 of the dedicated display software.

FIGS. 5 through 8 illustrate a series of display of the GUI 20 of the dedicated display software in this preferred embodiment.

FIG. 5 illustrates a state where the color conversion menu of the GUI 20 of the dedicated display software in this preferred embodiment is selected. The color conversion menu 31 includes the ON/OFF selection of a color conversion mode and a color adjustment menu 33. When the color conversion mode 32 is switched ON, an image whose color is converted by a color parameter adjusted by a color adjustment menu, which will be described later, is displayed. When the color adjustment menu 33 is executed, a screen as illustrated in FIG. 6 is displayed.

Figure 6:
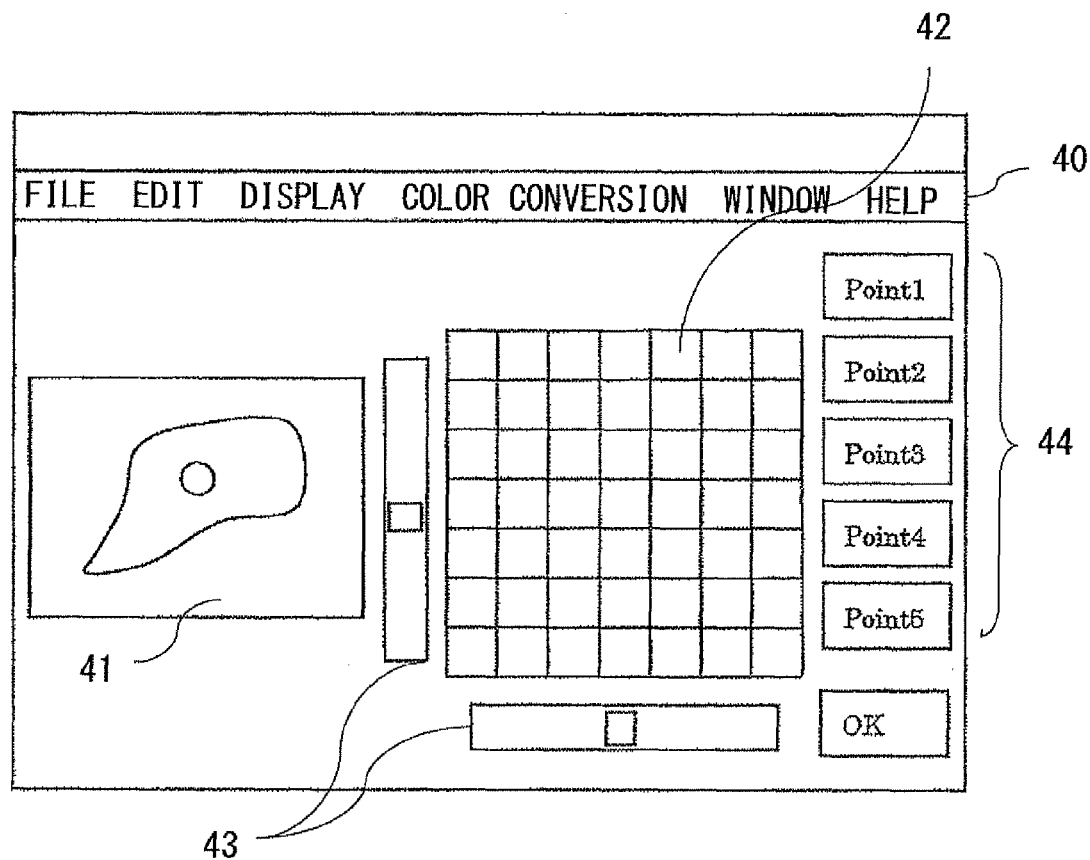
FIG. 6 illustrates one example of a color adjustment screen 40 in this preferred embodiment.

FIG. 6 illustrates one example of a color adjustment screen 40 in this preferred embodiment. The color adjustment screen 40 includes a specimen 41, a color chart 42, a color chart adjustment slider 43 for adjusting the color difference of the color chart 42 and an attention area selection button 44 for selecting the attention area of a specimen.

Figure 9:
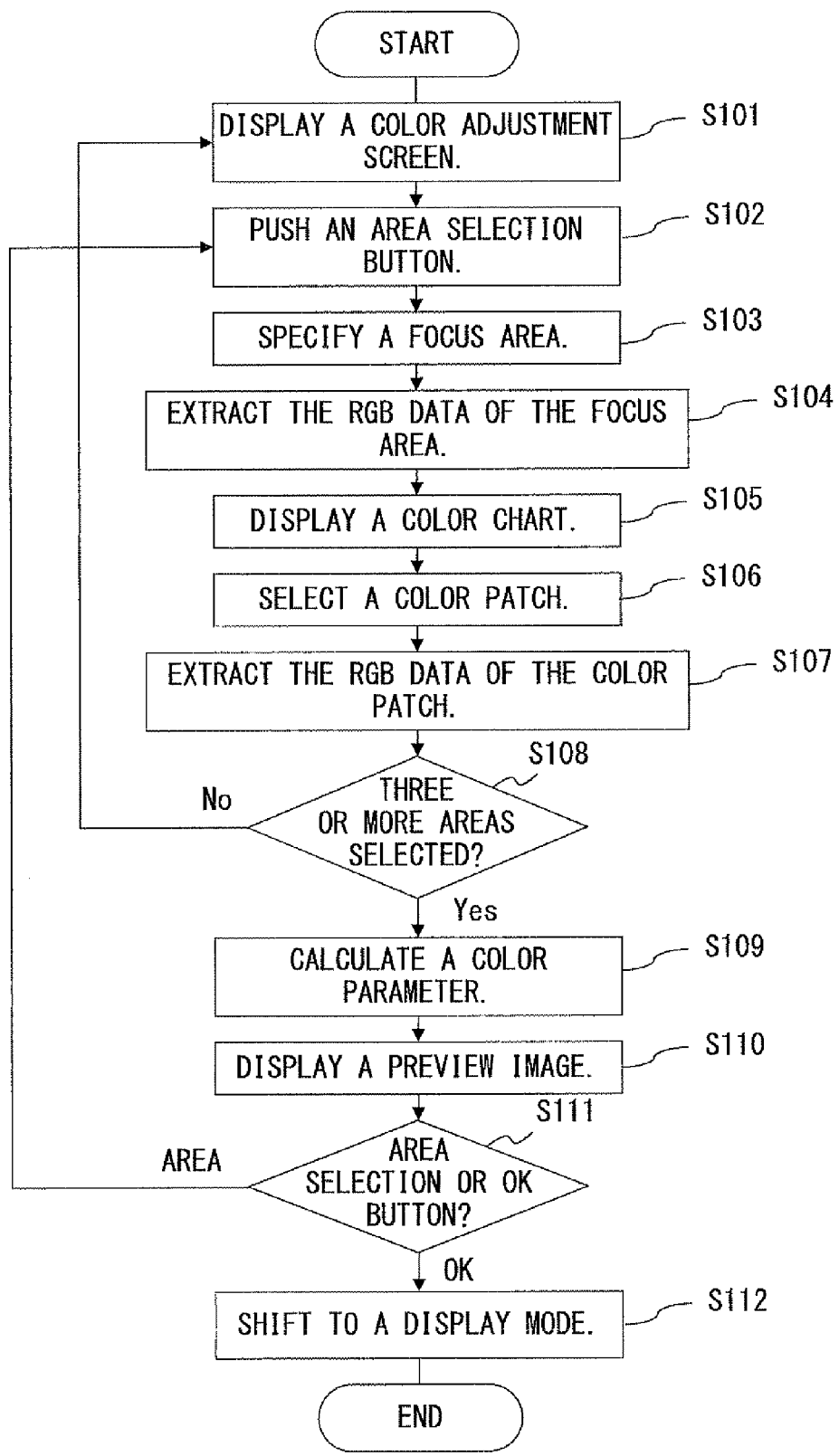
FIG. 9 illustrates the flow of the process performed by the CPU 52 of the PC 5 when a color adjustment menu 33 is selected in the first preferred embodiment.

FIG. 9 illustrates the flow of the process performed by the CPU 52 of the PC 5 when the color adjustment menu 33 is selected in the first preferred embodiment.

The flow will be explained below with reference to the screen transition diagrams in FIGS. 5 through 8.

When the color adjustment menu 33 is selected, the CPU 52 enters a color adjustment mode and the color adjustment screen 40 is displayed on the monitor 6 of the PC 5 (S101). When the color adjustment screen 40 is displayed, an operator pushes a Point 1 button (S102) and specifies an attention area in a specimen image 41 (S103).

When the attention area is specified by the operator, the CPU 52 extracts the RGB data (R1, G1, B1) (S104). The CPU 52 displays a color chart 42 composed of a plurality of color patches whose hue/chroma are changed around the extracted RGB color (symbol "a" in FIG. 7) (S105).

The operator compares it with the visual observation image of a microscope and selects a color patch on the color chart 12, which coincides with the color of the attention area. For example, a portion indicated by a symbol "b" in FIG. 7 is selected. Then, the CPU 52 extracts the RGB data (R1', G1', B1') of the selected color patch (S107).

Then, the CPU 52 determines whether three or more attention areas are specified and their color patches are selected (S108). If the number of the specified attention areas and the selected color patches is less than three, the process returns to S102 and waits for the specification of another area.

Then, the operator pushes a Point 2 button (S102) and specifies an attention area in the specimen image 41 (S103).

When the attention area is specified by the operator, the CPU 52 extracts the RGB data (R2, G2, B2) of the attention area (S104). The CPU 52 displays a color chart 42 composed of a plurality of color patches whose hue/chroma are changed around the extracted RGB color (S105).

The operator compares it with the visual observation image of a microscope and selects a color patch on the color chart 12, which coincides with the color of the attention area (S106). Then, the CPU 52 extracts the RGB data (R2', G2', B2') of the selected color patch (S107).

Then, the CPU 52 determines whether three or more attention areas are specified and their color patches are selected (S108). If the number of the specified attention areas and the selected color patches is less than three, the process returns to S102 and waits for the specification of another area.

Then, the operator pushes a Point 3 button (S102) and specifies an attention area in the specimen image 41 (S103). When the attention area is specified by the operator, the CPU 52 extracts the RGB data (R3, G3, B3) of the attention area (S104). The CPU 52 displays a color chart 42 composed of a plurality of color patches whose hue/chroma are changed around the extracted RGB color (S105).

The operator compares it with the visual observation image of a microscope and selects a color patch on the color chart 12, which coincides with the color of the attention area (S106). Then, the CPU 52 extracts the RGB data (R3', G3', B3') of the selected color patch (S107).

When as illustrated in FIG. 8, three or more attention areas are selected ("Yes" in S108), the CPU 52 calculates a color conversion matrix M according to the following Equation (1) (S109).

$$M = \begin{pmatrix} R1' & R2' & R3' & \dots \\ G1' & G2' & G3' & \dots \\ B1' & B2' & B3' & \dots \end{pmatrix} \cdot \begin{pmatrix} R1 & R2 & R3 & \dots \\ G1 & G2 & G3 & \dots \\ B1 & B2 & B3 & \dots \end{pmatrix}^{-1} \quad (1)$$

However, if four or more areas are selected, the following part in the Equation (1) is assumed to be pseudo inverse matrix.

$$\begin{pmatrix} R1 & R2 & R3 & \dots \\ G1 & G2 & G3 & \dots \\ B1 & B2 & B3 & \dots \end{pmatrix}^{-1}$$

Then, the specimen image is color-converted from (Rin, Din, Bin) to (Rout, Gout, Bout) for each pixel by the CPU 52 according to the following equation (2).

$$\begin{pmatrix} Rout \\ Gout \\ Bout \end{pmatrix} = M \cdot \begin{pmatrix} Rin \\ Gin \\ Bin \end{pmatrix} \quad (2)$$

Furthermore, if the selection of Point 4 and after is made by the operator (an "area selection button" is selected in S111), the process returns to S103 and the same processes are performed. Furthermore, if an "OK button" is pushed in S111, the mode shifts to the display mode illustrated in FIG. 4 (S112). In this case, a specimen image to which color conversion according to Equation (2) is applied is displayed.

By the above-described functions, an image picked up by a microscope digital camera can be easily converted to and displayed in the preferable color of an operator.

(Variation 1.1)

Color difference between color patches on the color chart 42 can be adjusted by adjusting a color chart adjustment slider 43. When there is no desired color for an operator on the color chart 42, by adjusting thus, the color difference between color patches can be expanded and color can be more widely selected.

If it is desired to be finely adjusted, the color difference between color patches is narrowed. When color difference is adjusted by the color chart adjustment slider 43, a color chart is displayed again around the previously selected color patch. The color of the color chart 42 is generated in such a way that the color intervals of a color patch become perceptively uniform, by converting RGB data to the data of uniform color space, such as CIE L*a*b* or the like.

(Variation 1.2)

An attention area in a specimen can be specified by the following various methods.

Figure 10:
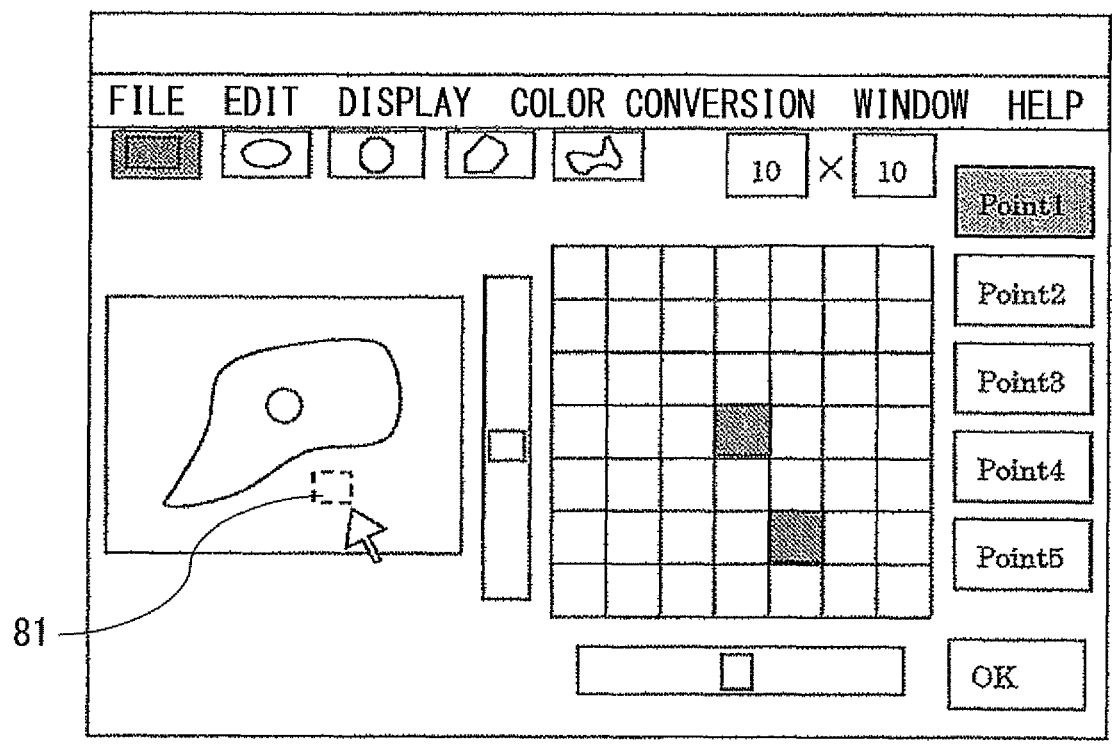
FIG. 10 illustrates a specification example of an attention area in the first preferred embodiment (variations 1 and 2) (No. 1).

FIGS. 10 through 14 illustrate specification examples of an attention area in this preferred embodiment (variation 1.2). As illustrated in FIG. 10, the area can be selected by a quadrangle 81. In this case, the size of the area can be arbitrarily selected by the drugging of a pointer, such as a mouse or the like. Alternatively, it can be specified by a numeric value, for example, it can be specified as an area of 10 pixels by 10 pixels. When an attention area is specified in an image, RGB data extracted in S104 can be the average RGB data of the area. Alternatively, a predetermined representative color can be extracted.

Figure 12:
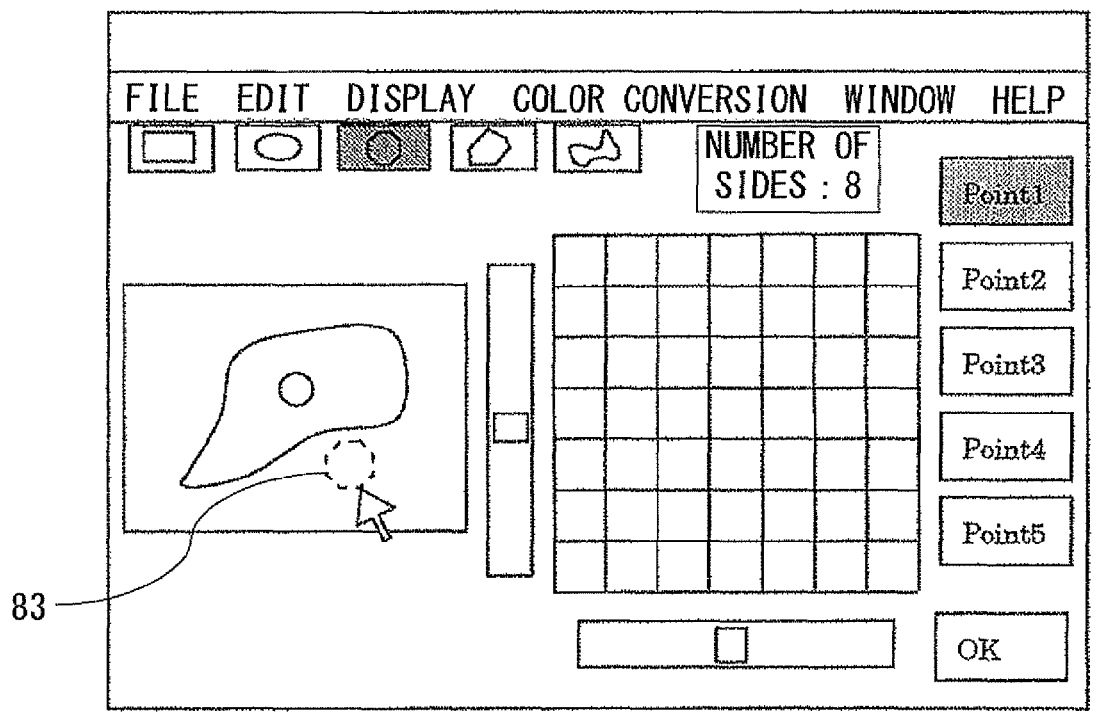
FIG. 12 illustrates a specification example of an attention area in the first preferred embodiment (variations 1 and 2) (No. 3).

As illustrated in FIGS. 11 and 12, any size can be arbitrarily specified in an ellipse 82, a circle and an arbitrary polygon. Alternatively, an attention area can also be selected by specifying coordinates, the size of a figure and the like by a numeric value.

Figure 13:
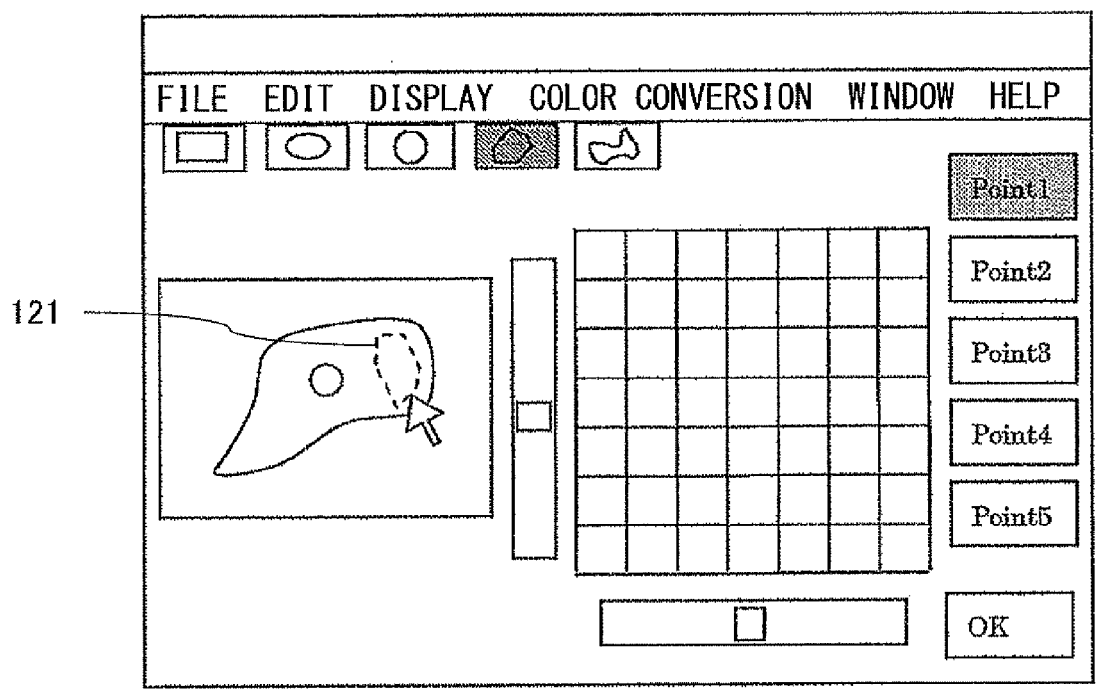
FIG. 13 illustrates a specification example of an attention area in the first preferred embodiment (variations 1 and 2) (No. 4).
Figure 14:
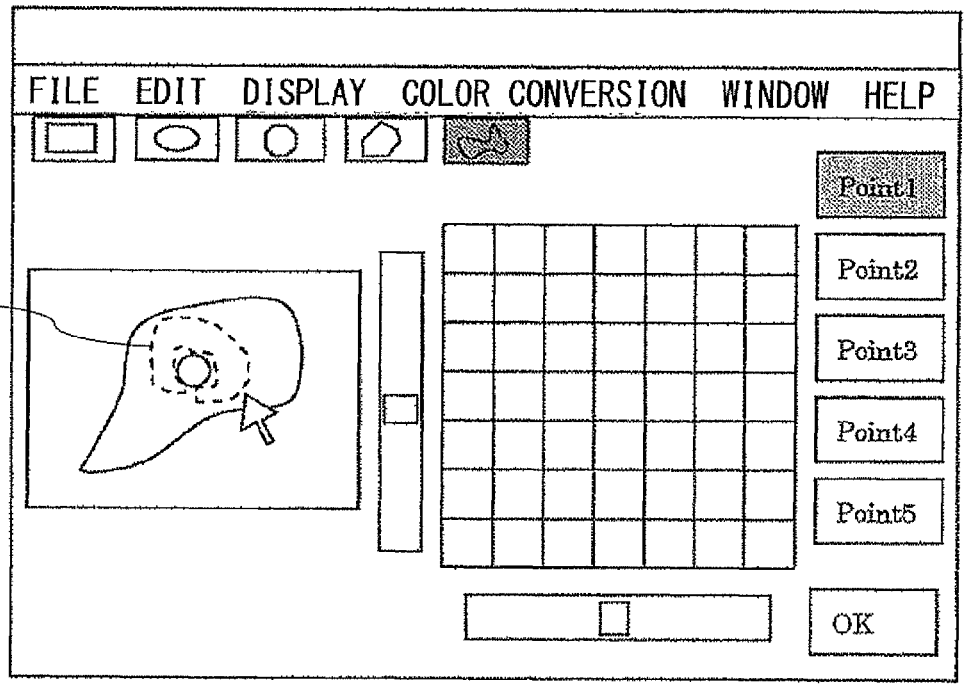
FIG. 14 illustrates a specification example of an attention area in the first preferred embodiment (variations 1 and 2) (No. 5).

As illustrated in FIG. 13, an attention area can also be enclosed by dragging a curve 121 a mouse. As illustrated in FIG. 14, an attention area can also be specified by a polygon 121 connecting a plurality of points.

(Variation 1.3)

When in a color adjustment process, a specific color enters an optimal state in a preview image, the color can be excluded and color adjustment can be made. Specifically, a user specifies a color which a user determines to be optimal. Then, the CPU 52 excludes a color having hue/chroma around the specified color from the adjustment target image. For such an exclusion process, for example, an condition that the RGB data of an image is converted to lightness/hue/chroma data, such as CIE L*a*b* or the like and a pixel in which $-\Delta<a^{*\prime}<\Delta$ and $-\Delta<b^{*\prime}<\Delta$ hold true when its specified color is assumed to be CIE L*'a*'b*' is not processed and so on can be set. In this case, color can be specified in units of pixels.

(Variation 1.4)

If the three selected areas are located near each other or their RGB data is not independently linear, an error message can also be issued, Alternatively, if one or more areas are specified, a non-independently linear area can be prevented from being selected. Alternatively, if three or more areas cannot be specified, the specification can also be adjusted by a predetermined color or a reversal color of the color of a specimen.

Since even when the specification is adjusted as in this variation, at least one or more colors in an image can be adjusted by the taste of an operator, the specification can be more preferably adjusted, compared with adjustment by simply displaying a test pattern.

(Variation 1.5)

Alternatively, the RGB data of all the pixels of a specimen image can also be converted to CIE L*a*b* data and the three farthest separated colors can also be automatically specified. For example, if the data of all the pixels is plotted on a CIE L*a*b* chromaticity diagram, FIG. 15 can be obtained.

FIG. 15 illustrates one example of plotting the data of all pixels on a CIE L*a*b* chromatic diagram in this preferred embodiment (variation 1.5). As illustrated in FIG. 15, points c, d and e indicating the three farthest separated colors are automatically set by the data of all the pixels plotted on a CIE L*a*b* chromaticity diagram.

In this case, the conversion target pixel is not limited to all the pixels of a specimen image. The RGB data of all the pixels in a predetermined area or an attention area of a specimen image can also be converted to CIE L*a*b* data and the three farthest separated colors can also be automatically specified.

<The Second Preferred Embodiment>

This preferred embodiment is an example of displaying an image on a notebook personal computer on the projector of a presentation hall for an academic society or the like.

Figure 16:
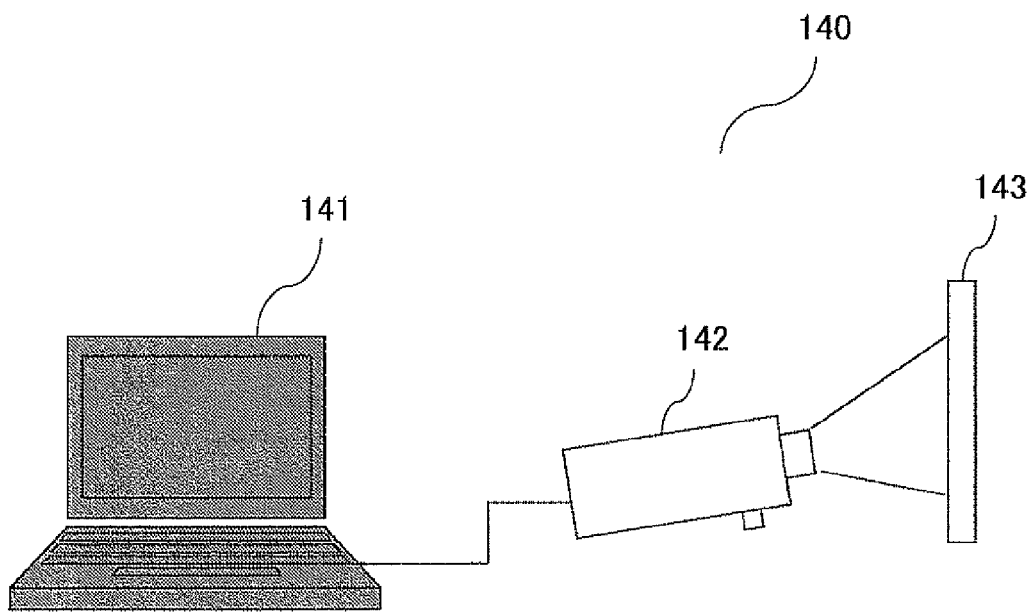
FIG. 16 illustrates a presentation system 140 in the second preferred embodiment.

FIG. 16 illustrates a presentation system 140 in this preferred embodiment. The presentation system 140 includes a notebook personal computer 141, a projector 142 connected to the notebook personal computer 131 and a screen 143.

The hardware configuration of the notebook personal computer 141 is the same as that illustrated in FIG. 2. An operator's operation screen is displayed on the monitor of the notebook personal computer 141. The projector 142 displays an audience's screen on the screen 143. At the time of presentation, the same image is displayed on the respective screens.

Firstly, the notebook personal computer 141 is set to a multi-monitor mode, such as a dual-monitor mode or the like, for both a monitor and a projector. Then, before presentation, an operator adjusts the color of the notebook personal computer 141 in such a way that an image displayed on the screen 143 has an optimal color.

Figure 18:
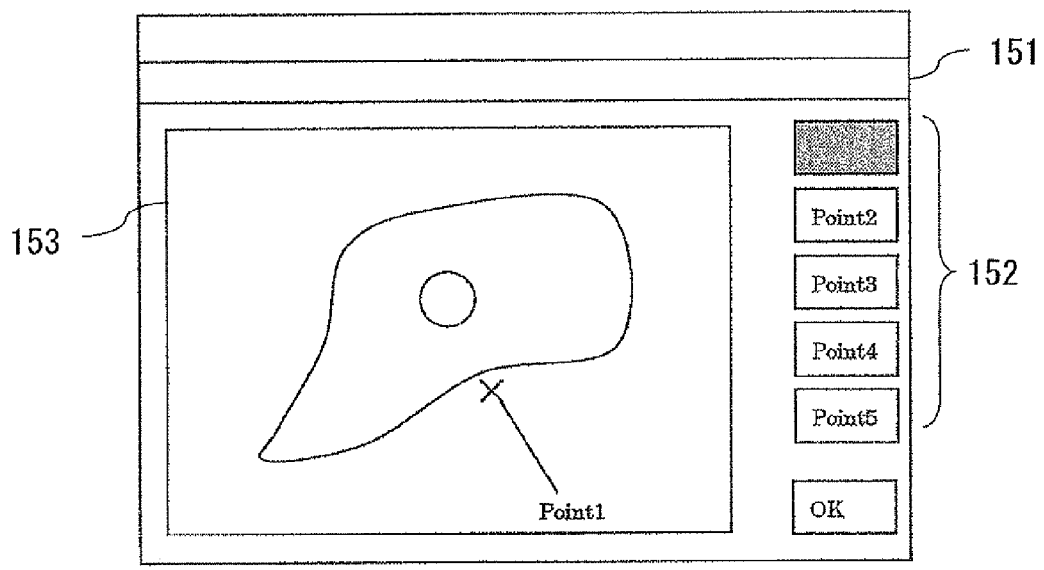
FIG. 18 illustrates an operator's color adjustment screen 151 in the second preferred embodiment.
Figure 19:
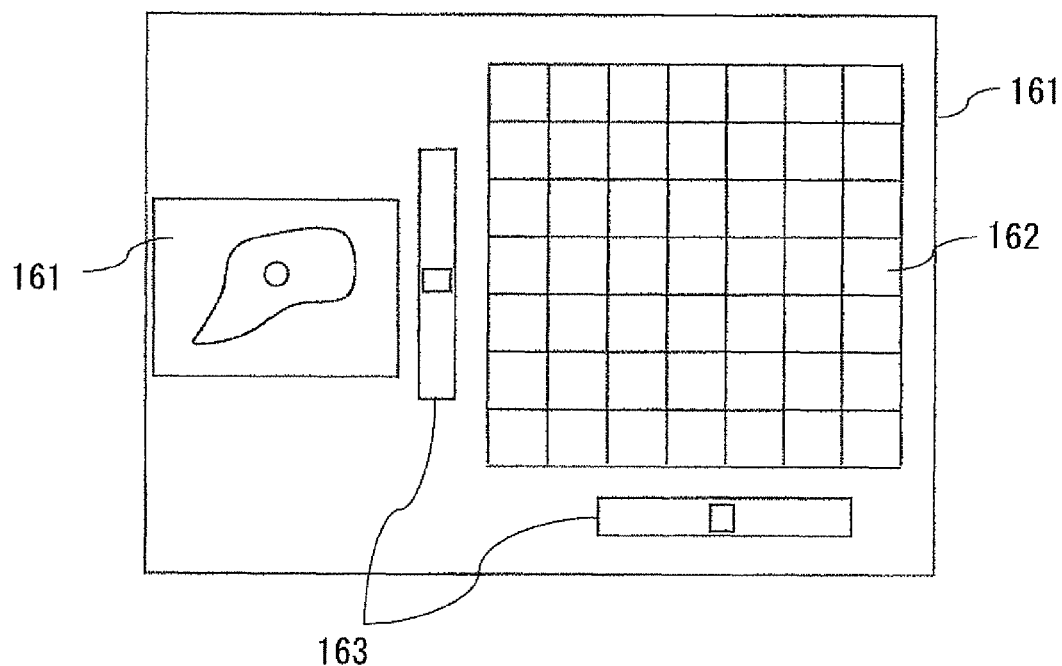
FIG. 19 illustrates a projector color adjustment screen 161 in the second preferred embodiment.

When the notebook personal computer 141 shifts to a color adjustment mode, an operator's color adjustment screen 151 is displayed on the notebook personal computer 141 (see FIG. 18) and a projector color adjustment screen 161 is displayed on the screen 143 (see FIG. 19).

FIG. 17 illustrates the summary of an image data processing device 100a in this preferred embodiment. The notebook personal computer 141 functions as an image data processing device 100a by executing a program for this preferred embodiment. The image data processing device 100a can be obtained by adding a color information storage unit 109 and a color temperature setting information acquisition unit 110 to the image data processing device 100. Both the color information storage unit 109 and the color temperature setting information acquisition unit 110 will be described later.

The above-described first image output unit 102 outputs the above-described first image (specimen image obtained by the microscope 1) to the first image display device (monitor of the notebook personal computer 141). The above-described color chart display unit 104 outputs the above-described color chart to the second image display device (projector 142). The above-described second image output unit 108 outputs the above-described second image to the above-described second image display device (projector 142).

Thus, an image on the first image display device and an image on the second image display device can be easily matched and displayed.

Thus, the color of an attention area selected on the first image display device can be converted to that of an image displayed on the second image display device in such a way as to coincide with the taste of an operator.

The color information storage unit 109 (HDD 56) stores the obtained color information. In this case, the first image output unit outputs the stored color information to the first image display device. The color chart display unit displays a color chart whose hue and chrome are gradually changed toward around the color around a color corresponding to the stored color information on the second image display device. The above-described selected color information acquisition unit obtains arbitrarily selected color information from the displayed color chart.

Thus, a color on the color chart selected when calculating a color parameter can be stored. Then, the color can be displayed on the first image display device and a color chart whose hue and chroma are changed around the color can be displayed on the second image display device. Then, a color that is felt to coincide with a color displayed on the first image display device on the color chart can be selected and a plurality of combinations of a color displayed on the first image display device and a color selected on the color chart can be generated. Then, a color parameter can be calculated on the basis of the combinations, original image data can be converted using this color parameter and converted image data can be outputted to the second image display device. Therefore, the color of an attention area selected when adjusting color in advance on the first image display device can be converted to that of an image displayed on the second image display device in such a way as to coincide with the taste of an operator.

The color temperature setting information acquisition unit 110 can obtain the color information of the white point of the first image set on the basis of the respective color temperature adjustment functions of the first image display device (monitor of the notebook personal computer 141) and the second image display device (projector 142). Thus, the color of the white point of the original image can be converted according to the color temperature setting of a display device.

After that, color adjustment is made according to the flowchart illustrated in FIG. 9. When the color adjustment menu 33 is selected, the mode shifts to a color adjustment mode (S101). Then, the operator's color adjustment screen 151 is displayed on the monitor of the notebook personal computer 141. On the other hand, the projector color adjustment screen 161 is displayed on the screen 143.

As illustrated in FIG. 18, the operator's color adjustment screen 151 includes a specimen image 153 and an attention area selection button 152 for selecting an attention area in the specimen image 153.

As illustrated in FIG. 19, the projector color adjustment screen 161 includes a preview image 161, a color chart 162 and a color chart adjustment slider 163 for adjusting the color difference of a color chart.

When the operator's color adjustment screen 151 is displayed, an operator pushes a Point 1 button (S102) and specifies an attention area in the specimen image 153 (S103). When an attention area is specified, the CPU 52 extracts the RGB data (R1, G1 and B1) of the attention area (S104).

Then, the CPU 52 displays a color chart 162 composed of a plurality of color patches whose hue/chromes are changed around the color of the extracted RGB on the screen 143 via the projector 142 (S105).

The operator compares a specimen image 19 displayed on the notebook personal computer 141 with a color chart 12 and selects a color patch coinciding with the color of the attention area (S106) on the color chart 162. The CPU 52 extracts the RGB data (R1', G1' and B1') of the selected color patch (S107).

Then, the CPU 52 determines whether three or more attention areas are specified and their color patches are selected (S108). If less than three attention areas are specified and their color patches are selected, the process returns to S102 and waits for another area specification.

Then, the operator pushes a Point 2 button (S102) and specifies another attention area in the specimen image (S103).

When another attention area is specified by the operator, the CPU 52 extracts the RGB data (R2, G2 and B2) of the attention area (S104). The CPU 52 displays a color chart 162 whose hue/chroma are changed around the color of the extracted RGB on the screen 143 via the projector 142 (S105). The operator compares it with a specimen image 153 on the notebook personal computer 141 and selects a color patch coinciding with the color of the attention area on the color chart 162 (S106).

Then, the CPU 52 extracts the RGB data (R2', G2' and B2') of the selected color patch (S107).

Then, it is determined whether three or more attention areas are specified and their patches are selected (S108). If less than three attention areas are specified and their color patches are selected, the process returns to S102 and waits for another area specification.

Then, the operator pushes a Point 3 button (S102) and specifies another attention area in the specimen image (S103). When another attention area is specified by the operator, the CPU 52 extracts the RGB data (R3, G3, B3) of the attention area (S104). The CPU 52 displays a color chart 162 whose hue/chroma are changed around the color of the extracted RGB (S105).

The operator compares it with a specimen image 142 on the notebook personal computer 141 and selects a color patch coinciding with the color of the attention area on the color chart 152 (S106). Then, the CPU 52 extracts the RGB data (R3', G3', B3') of the selected color patch (S107).

If three or more attention areas are selected, the CPU 52 calculates a color conversion matrix M according to Equation (1) (S109).

Then, the color of the specimen image is converted from (Rin, Gin and Bin) to (Rout, Gout and Bout) for each pixel by the CPU 52 according to Equation (2) and its preview image is updated S110).

If the operator selects Point 4 and after (selects an "area selection button" in S111), the process returns to S103 and the same processes are performed. If an OK button is pushed in Sill, the mode returns to the display mode illustrated in FIG. 4.

Figure 20:
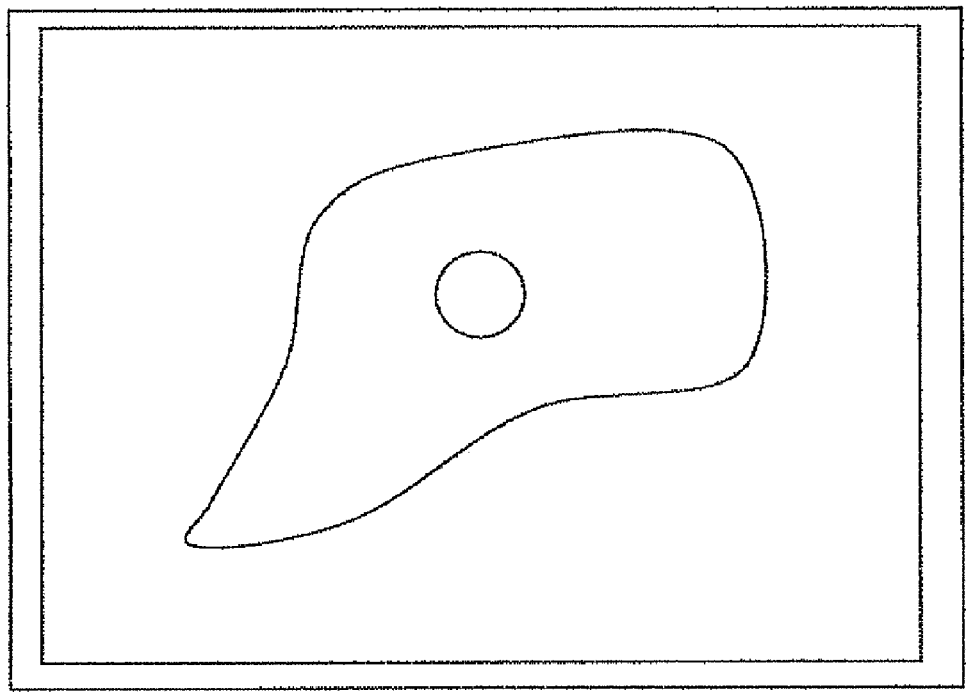
FIG. 20 illustrates a specimen image displayed on a screen 143 by a projector 142 after color adjustment in the second preferred embodiment.

In this case, a specimen image as illustrated in FIG. 20 is displayed on the screen 143 via the projector 142 (S112). In this case, an image whose color is converted according Equation (2) is displayed.

Thus, the color of an image on the notebook personal computer 141 and that of an image on the screen 143 displayed via the projector 142 can be easily matched and displayed.

(Variation 2.1)

Although in the above-described example, both the display environment of a notebook personal computer at a presentation hall and the display environment of a projector are adjusted, in this variation, an image whose color is converted in advance in the first preferred embodiment and which is stored is displayed on a projector at a presentation hall in an academic society or the like.

The color on the color chart selected when calculating a color parameter in the first preferred embodiment is stored in the HDD 56 of the. At the presentation hall, an operator activates the notebook personal computer 141 and displays the color stored in the HDD 56 on the monitor of the notebook personal computer 141.

Then, the operator displays a color chart 162 composed of a plurality of color patches whose hue/chromes are changed around the color on the screen 143 via the projector 142.

The operator compares the color displayed on the notebook personal computer 141 with the color chart 162 and selects a color that is felt to coincide with the color displayed on the notebook personal computer 141 from the color chart 162. Then, three or more combinations of a color displayed on the notebook personal computer 141 and a color selected on the color chart 162 are selected.

If three or more combinations are selected, the CPU 52 calculates a color conversion matrix M according to Equation (1). Then, the color of a specimen image is converted from (Rin, Gin, Bin) to (Rout, Gout, Bout) for each pixel by the CPU 52 according to Equation (2) and its preview image is updated.

Thus, the color of an attention area selected when adjusting color in advance on the notebook personal computer 141 can be converted to that of an image displayed on the screen 143 in such a way as to coincide with the taste of the operator via the projector 142.

(Variation 2.2)

When both the notebook personal computer 141 and the projector 142 have a color temperature adjustment function, the adjustment can be simplified by matching the color temperature of the notebook personal computer 141 with that of the projector 142.

In this case, one combination of the above-described three or more selected combinations can be made (R1, G1, B1)=(R1', G1', B1')=(255, 255, 255). Thus, since the number of colors selected on a color chart can be made two or more, the adjustment can be simplified.

(Variation 2.3)

The maker name, serial number and its corresponding color adjustment parameter of a projector once adjusted are stored. If a projector has the same maker and serial number when making a presentation at another hall and so on, the stored color adjustment parameter can be read and used. Alternatively, it can be displayed on the screen illustrated in FIG. 7 and can be adjusted around the parameter.

Thus, since up to S110 illustrated in FIG. 9 can be automatically reproduced, the adjustment can be simplified.

As described above, according to the present invention, even in the case of an image display device having a different characteristic from that intended by an image to be displayed, its output characteristic can be easily adjusted in such a way as to display a desired color.

The application of the present invention is not limited to the above-described preferred embodiments and it can also have various configuration or preferred embodiments as long as it does not depart from the subject matter of the present invention.

What is claimed is:

1. An image data processing device capable of outputting image data to at least one image display device, the image data processing device comprising:

a first image acquisition unit for obtaining first image data;

a first image output unit for outputting the first image data to the at least one image display device;

an attention area acquisition unit for obtaining an attention area composed of one or more arbitrarily specified pixels from the first image outputted to the at least one image display device;

a color chart display unit for displaying a color chart whose hue and chroma are gradually changed toward around the color corresponding to the image data of the attention area;

a selected color information acquisition unit for obtaining arbitrarily selected color information from the displayed color chart;

a color parameter calculation unit for obtaining a plurality of combinations of the attention area and the color information corresponding to the attention area and calculating a color parameter on the basis of the obtained plurality of combinations;

a color conversion unit for converting the color of the obtained image data on the basis of the color parameter; and a second image output unit for outputting the image data whose color is converted, to the at least one image display device as a second image;

wherein the first image output unit outputs the first image to a first image display device, the color chart display unit outputs the color chart to a second image display device and the second image output unit outputs the second image to the second image display device;

further comprising a color temperature setting information acquisition unit for obtaining color information of a white point of the first image set on the basis of respective color temperature adjustment functions of the first image display device and the second image display device, wherein the color parameter calculation unit calculates the color parameter on the basis of a combination of the obtained attention area and the color information, and color information obtained by the color temperature setting information acquisition unit.

2. A non-transitory computer-readable portable storage device having a stored image data processing computer program for enabling a computer to execute a process for outputting image data to at least one image display device, the computer program comprising: obtaining first image data; outputting the first image data to the at least one image display device;

obtaining an attention area composed of one or more arbitrarily specified pixels from the first image outputted to the at least one image display device;

displaying a color chart whose hue and chroma are gradually changed toward around a color corresponding to the image data of the attention area;

obtaining arbitrarily selected color information from the displayed color chart;

obtaining a plurality of combinations of the attention area and the color information corresponding to the attention area and calculating a color parameter on the basis of the obtained plurality of combinations;

converting a color of the obtained image data on the basis of the color parameter; and outputting the image data whose color is converted, to the at least one image display device as a second image;

wherein the first image is output to a first image display device, the color chart display is output to a second image display device and the second image is output to the second image display device;

further comprising obtaining color information of a white point of the first image set on the basis of respective color temperature adjustment functions of the first image display device and the second image display device, wherein the color parameter is obtained on the basis of a combination of the obtained attention area and the color information, and color information obtained on the basis of respective color temperature adjustment functions.

3. An image data processing method for outputting image data to at least one image display device, the method comprising:

obtaining first image data;

outputting the first image data to the at least one image display device;

obtaining an attention area composed of one or more arbitrarily specified pixels from the first image outputted to the at least one image display device;

displaying a color chart whose hue and chroma are gradually changed toward around a color corresponding to the image data of the attention area;

obtaining arbitrarily selected color information from the displayed color chart;

obtaining a plurality of combinations of the attention area and the color information corresponding to the attention area and calculating a color parameter on the basis of the obtained plurality of combinations;

converting a color of the obtained image data on the basis of the color parameter; and outputting the image data whose color is converted, to the at least one image display device as a second image;

wherein the first image is output to a first image display device, the color chart display is output to a second image display device and the second image is output to the second image display device;

further comprising obtaining color information of a white point of the first image set on the basis of respective color temperature adjustment functions of the first image display device and the second image display device, wherein the color parameter is obtained on the basis of a combination of the obtained attention area and the color information, and color information obtained on the basis of respective color temperature adjustment functions.

* * * * *